(12) United States Patent
Meyer et al.

(10) Patent No.: US 7,091,296 B2
(45) Date of Patent: Aug. 15, 2006

(54) UV-CROSSLINKABLE COPOLYMERS

(75) Inventors: Harald Meyer, Wachenheim (DE);
Heike Becker, Frankenthal (DE);
Ulrich Erhardt, Ladenburg (DE);
Karl-Heinz Schumacher, Neustadt (DE); Martin Jung, Mannheim (DE);
Jochem Henkelmann, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/502,647

(22) PCT Filed: Feb. 4, 2003

(86) PCT No.: PCT/EP03/01057

§ 371 (c)(1),
(2), (4) Date: Aug. 3, 2004

(87) PCT Pub. No.: WO03/070792

PCT Pub. Date: Aug. 28, 2003

(65) Prior Publication Data

US 2005/0080213 A1    Apr. 14, 2005

(30) Foreign Application Priority Data

Feb. 19, 2002   (DE) ................. 102 06 987

(51) Int. Cl.
*C08F 118/04* (2006.01)

(52) U.S. Cl. .................................... 526/319
(58) Field of Classification Search ................. 526/319
See application file for complete search history.

(56) References Cited

U.S. PATENT DOCUMENTS 3,215,665 A    11/1965   Sharetts et al.
3,265,760 A    8/1966    Tocker et al.
5,080,994 A *  1/1992    Breton et al. .......... 430/137.17

FOREIGN PATENT DOCUMENTS

| DE | 2 411 169 | 9/1974 |
|---|---|---|
| EP | 246 848 | 11/1987 |
| EP | 346 788 | 12/1989 |
| EP | 377 199 | 7/1990 |

* cited by examiner

*Primary Examiner*—Robert D. Harlan
(74) *Attorney, Agent, or Firm*—Oblon, Spivak, McClelland, Maier & Neustadt, P.C.

(57) ABSTRACT

The present invention relates to the use of acetophenone or benzophenone derivatives of the formula I

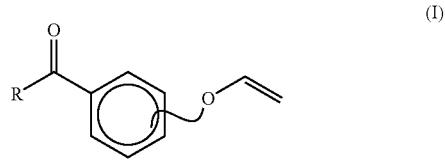

where
R is unsubstituted or substituted
  $C_1$ to $C_3$ alkyl,
  $C_6$ to $C_{10}$ aryl or
  aralkyl having from 6 to 10 carbon atoms in the aryl moiety and from 1 to 6 carbon atoms in the alkyl moiety as copolymerizable photoinitiators.

The invention further relates to copolymers containing acetophenone or benzophenone derivatives of the formula I in copolymerized form, to processes for preparing said copolymers, and to the use of said copolymers in UV crosslinkable compositions.

12 Claims, No Drawings

UV-CROSSLINKABLE COPOLYMERS

The present invention relates to the use of acetophenone or benzophenone derivatives of the formula I (referred to below for short as "copolymerizable photoinitiators"),

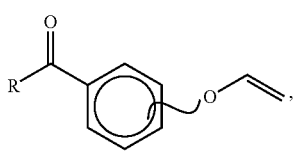

where
R is unsubstituted or substituted
$C_1$ to $C_3$ alkyl,
$C_6$ to $C_{10}$ aryl or
aralkyl having from 6 to 10 carbon atoms in the aryl moiety and from 1 to 6 carbon atoms in the alkyl moiety as copolymerizable photoinitiators.

The invention further relates to copolymers containing acetophenone or benzophenone derivatives of the formula I in copolymerized form, to processes for preparing said copolymers, and to the use of said copolymers in UV crosslinkable compositions.

UV crosslinkable adhesives containing photoinitiators in copolymerized form are known, for example, from the text DE-A 2411169.

Copolymerizable benzophenone or acetophenone derivatives are described, for example, in the texts EP-A 346788 and EP-A 377199.

The text EP-A 246848 discloses pressure sensitive adhesives for use on skin which comprise among other ingredients a crosslinked copolymer. The copolymer is prepared using ethylenically unsaturated aromatic ketone derivatives with a broad variety of substituents.

Copolymerizable photoinitiators are to be easy to prepare and are to undergo copolymerization readily, and the copolymers comprising photoinitiators are to exhibit good performance properties in use, particularly high cohesion and adhesion when used as adhesives. Moreover, copolymers comprising the photoinitiators are to be stable to hydrolysis in the course of their preparation, storage, and application.

It is an object of the present invention to provide novel copolymerizable photoinitiators, copolymers containing these photoinitiators in copolymerized form, which, when used as adhesives, exhibit not only improved cohesion and adhesion but also increased stability to hydrolysis.

We have found that this object is achieved by the copolymerizable photoinitiators defined at the outset, copolymers containing them, and their use in UV crosslinkable compositions.

In the copolymerizable photoinitiators of the formula I used in accordance with the invention R denotes unsubstituted or substituted
$C_1$ to $C_3$ alkyl, such as methyl, ethyl, n-propyl or iso-propyl, preferably methyl,
$C_6$ to $C_{10}$ aryl, such as phenyl or naphthyl, preferably phenyl, or
aralkyl having from 6 to 10 carbon atoms in the aryl moiety and from 1 to 6 carbon atoms in the alkyl moiety, an example being benzyl.

Particularly suitable substituents include halogens, such as fluorine, chlorine, and bromine, $C_1$ to $C_6$ alkyl groups, such as methyl, ethyl, n-propyl or iso-propyl, n-butyl, iso-butyl or tert-butyl, n-pentyl, iso-pentyl or tert-pentyl, n-hexyl, iso-hexyl or tert-hexyl, ester groups, such as methoxycarbonyl and ethoxycarbonyl, and alkoxy groups, such as methoxy, ethoxy or n-butoxy. The radicals R may contain up to 1, 2 or 3 of these substituents.

It is significant that the vinyloxy group in compounds of the formula I can be in position 2, 3 or 4 with respect to the carbonyl group. Mixtures of these compounds can of course also be used. Preferably, however, in the copolymerizable photoinitiators used, the vinyloxy group is in position 2 or 4 and in particular in position 4 with respect to the carbonyl group.

Examples of copolymerizable photoinitiators used include 2-vinyloxyacetophenone, 3-vinyloxyacetophenone, 4-vinyloxyacetophenone, 2-vinyloxybenzophenone, 3-vinyloxybenzophenone or 4-vinyloxybenzophenone, preferably 2-vinyloxyacetophenone, 4-vinyloxyacetophenone, 2-vinyloxybenzophenone or 4-vinyloxybenzophenone and especially 4-vinyloxyacetophenone or 4-vinyloxybenzophenone, alone or in a mixture.

The preparation of the copolymerizable photoinitiators is known to the skilled worker and takes place, for example, by a metal salt catalyzed reaction of the corresponding phenol compounds II where R is as defined above with acetylene:

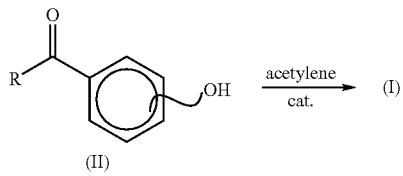

The copolymers of the invention are obtained by free-radical polymerization of a mixture of ethylenically unsaturated compounds (monomers) containing the copolymerizable photoinitiators normally in a total amount of from 0.01 to 10% by weight, preferably from 0.05 to 5% by weight and with particular preference from 0.1 to 2% by weight, based in each case on the total monomer amount. Accordingly, the copolymerizable photoinitiators are copolymerized in the copolymers in amounts of from 0.01 to 10% by weight, preferably from 0.05 to 5% by weight, and with particular preference from 0.1 to 2% by weight. At this point it may be stated that the percentage amounts specified in the description for the ethylenically unsaturated copolymerizable photoinitiators copolymerized in the copolymer, and for the other monomers, are generally intended to correspond to the amounts of these components in the monomer mixture to be polymerized, and vice versa.

In addition to the abovementioned photoinitiators, the copolymers include generally predominant fractions, usually from 50 to 99.99% by weight, preferably from 70 to 97.5% by weight, of principal monomers comprising esters of preferably $C_3$ to $C_6$ α, β-monoethylenically unsaturated monocarboxylic and dicarboxylic acids, such as particularly acrylic acid, methacrylic acid, maleic acid, fumaric acid, and itaconic acid, with alkanols having generally from 1 to 12, preferably from 1 to 8, and in particular from 1 to 4, carbon atoms, such as particularly methyl, ethyl, n-butyl, iso-butyl and 2-ethylhexyl acrylate and methacrylate, dimethyl maleate or di-n-butyl maleate, in copolymerized form. Suitable comonomers include in particular monomers which are easy to polymerize free-radically, such as ethylene, vinylaromatic monomers, such as styrene, α-methylstyrene, o-chlorostyrene or vinyltoluenes, esters of vinyl alcohol and $C_1$ to $C_{18}$ monocarboxylic acids, such as vinyl acetate, vinyl propionate, and vinyl n-butyrate, vinyl laurate, and vinyl stearate, nitriles of α,β-monoethylenically unsaturated carboxylic acids, such as acrylonitrile, and also $C_{4-8}$ conjugated dienes, such as 1,3-butadiene and isoprene, for example.

Additionally to the abovementioned monomers, the copolymers contain with particular advantage from 0.1 to 15% by weight, preferably from 0.5 to 8% by weight, of $C_3$ to $C_6$ α,β-monoethylenically unsaturated monocarboxylic and dicarboxylic acids, their amides and/or their anhydrides, such as particularly acrylic acid, methacrylic acid, maleic acid, fumaric acid, and itaconic acid, acrylamide and methacrylamide, maleic anhydride, and also vinylsulfonic acid, 2-acrylamido-2-methylpropanesulfonic acid, styrenesulfonic acid, and the water-soluble salts thereof, and also N-vinylpyrrolidone and N-vinylimidazole.

Besides the monomers already mentioned, the copolymers may further contain other comonomers in copolymerized form, examples being those which commonly increase the internal strength of the films formed from the copolymers. These ethylenically unsaturated monomers normally contain at least one epoxy, hydroxyl, N-methylol or carbonyl group, or at least two nonconjugated ethylenically unsaturated double bonds. Examples thereof are N-alkylol amides of $C_3$ to $C_{10}$ α,β-monoethylenically unsaturated carboxylic acids, among which very particular preference is given to N-methylolacrylamide and N-methylolmethacrylamide, and also their esters with alkanols having from 1 to 4 carbon atoms. Also suitable, moreover, are monomers containing two vinyl radicals, monomers containing two vinylidene radicals, and monomers containing two alkenyl radicals. Particularly advantageous here are the diesters of dihydric alcohols with α,β-monoethylenically unsaturated monocarboxylic acids, among which preference is given to acrylic acid and methacrylic acid. Examples of such monomers containing two nonconjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates, and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylates, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Also of particular importance in this context are the $C_1$–$C_8$ hydroxyalkyl esters of acrylic and methacrylic acid, such as n-hydroxyethyl, n-hydroxypropyl or n-hydroxybutyl acrylate and methacrylate, and also compounds such as diacetone acrylamide and acetylacetoxyethyl acrylate and methacrylate. In accordance with the invention, the aforementioned monomers are frequently copolymerized in amounts of from 0.1 to 10% by weight, based on the total amount of the monomers to be polymerized.

The manner in which the monomeric components are added to the polymerization vessel in the course of the free-radical polymerization is known to the skilled worker. They may either be included in their entirety in the initial charge to the polymerization vessel or else added continuously or in stages at the rate at which they are consumed in the course of the free-radical polymerization. In each specific case this will depend on the chemical nature of the initiator system and on the polymerization temperature. Preferably, a small portion of the monomeric components is included in the initial charge and the remainder is supplied to the polymerization zone at the rate at which it is consumed. It is of course also possible to alter the composition of the monomer mixture to be polymerized in the course of the polymerization. These process variants are known to the skilled worker. Thus in what is known as the staged procedure, for example, a monomer mixture 1 is supplied first and then a monomer mixture 2 having a different monomer composition is supplied subsequently to the polymerization vessel at the rate at which they are consumed, with the composition of the monomer mixture supplied to the polymerization vessel being modified continuously in what is known as a gradient procedure. The polymerization frequently takes place under an inert gas atmosphere, under nitrogen or argon, for example.

The copolymers of the invention normally have K values of from 10 to 150 and often from 15 to 100. The K values are normally determined at 25° C. in accordance with DIN ISO 1628-1 using a 1% strength by weight solution of the copolymers in tetrahydrofuran. The K value is preferably from 25 to 55 if the copolymers are to be used as hotmelt pressure sensitive adhesives. Where the copolymers are to be used in UV-curable compositions for coating mineral surfaces, their K values are preferably from 60 to 100. Copolymers which are to be used for coating materials preferably have K values of from 15 to 85.

The copolymers of the invention may have glass transition temperatures of from –70 to +150° C. Depending on the intended use, there is frequently a requirement for copolymers whose glass transition temperatures are situated within particular ranges. By means of appropriate selection of the ethylenically unsaturated monomers to be polymerized it is possible for the skilled worker deliberately to prepare copolymers whose glass transition temperatures are situated within the desired range. Where, for example, the copolymers of the invention are to be used as pressure sensitive adhesives, the composition of the monomer mixture to be polymerized is selected such that the copolymers produced have glass transition temperatures of <0° C., frequently ≦–5° C., and often ≦–10° C. Where the copolymers are to find use, however, as UV-curable binders in coating formulations, the composition of the monomer mixture to be polymerized is selected such that the copolymers produced have glass transition temperatures of from –40 to +150° C., frequently from 0 to +100° C., and often from +20 to +80° C.

The glass transition temperature, $T_g$, is the limiting value of the glass transition temperature toward which it tends with increasing molecular weight according to G. Kanig (Kolloid-Zeitschrift & Zeitschrift für Polymere, Vol. 190, page 1, equation 1). The glass transition temperature is determined by the DSC method (Differential Scanning Calorimetry, 20 K/min, midpoint measurement, DIN 53 765).

According to Fox (T. G. Fox, Bull. Am. Phys. Soc. 1956 [Ser. II] 1, page 123 and in accordance with Ullmann's Encyclopädie der technischen Chemie, Vol. 19, page 18, 4th edition, Verlag Chemie, Weinheim, 1980), the glass transition temperature of copolymers with no more than a slight degree of crosslinking is given in good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, … n and $T_g^1, T_g^2, \ldots T_g^n$ are the glass transition temperatures of the polymers composed in each case of only one of the monomers 1, 2, . . . n, in degrees Kelvin. $T_g$ values for the homopolymers of the majority of the monomers are known and are listed, for example, in Ullmann's Encyclopedia of Industrial Chemistry, 5th ed., Vol. A21, page 169, VCH Weinheim, 1992; other sources of glass transition temperatures of homopolymers are constituted, for example, by J. Brandrup, E. H. Immergut, Polymer Handbook, 1st Ed., J. Wiley, New York 1966, 2nd Ed. J. Wiley, New York 1975, and 3rd Ed. J. Wiley, New York 1989.

The novel copolymers can be prepared by copolymerizing the monomeric components using the customary polymerization initiators and also, where appropriate, regulators, polymerization being carried out at the standard temperatures without solvent, in emulsion, in water or in suitable organic media, for example, or in solution. The novel copolymers are preferably prepared by polymerizing the monomeric components in organic solvents, especially in solvents having a boiling range of from 50 to 150° C., preferably from 60 to 120° C., using the customary amount of polymerization initiators, which is generally from 0.01 to 10% by weight, in particular from 0.1 to 4% by weight, based in each case on the total weight of the monomeric components. Particularly suitable organic solvents include alcohols, such as methanol, ethanol, n- and iso-propanol, n- and iso-butanol, cyclic ethers, such as tetrahydrofuran, and hydrocarbons, such as toluene and petroleum spirits with a boiling range of from 60 to 120° C. It is also possible to use ketones, such as acetone, methyl ethyl ketone, and methyl isobutyl ketone, and esters, such as ethyl acetate, and also mixtures of solvents of said type, preference being given to mixtures containing iso-butanol and/or methyl ethyl ketone in amounts of $\geq 70\%$ by weight, especially $\geq 80\%$ by weight, and in particular $\geq 90\%$ by weight, based on the solvent mixture employed.

The manner in which the solvent or solvent mixture is added to the polymerization vessel in the course of the free-radical polymerization is known to the skilled worker. It may either be included completely in the initial charge to the polymerization vessel or else inserted continuously or in stages in the course of the free-radical polymerization. The solvent may also be used in a mixture with the monomers and/or the initiator. It is preferred to include a major fraction of the solvent in the initial charge and to supply the remainder to the polymerization zone together with the monomers to be polymerized and/or initiators.

Examples of suitable polymerization initiators for solution polymerization include azo compounds, such as 2,2'-azobisiso-butyronitrile, 2,2'-azobis-2-methylbutyronitrile, diacyl peroxides, such as dibenzoyl peroxide, dilauroyl peroxide, didecanoyl peroxide, and diisononanoyl peroxide, alkyl peresters, such as tert-butyl perpivalate, tert-butyl per-2-ethylhexanoate, tert-butyl permaleate, tert-butyl perisononanoate, tert-butyl perneodecanoate, and tert-butyl perbenzoate, dialkyl peroxides, such as dicumyl peroxide or di-tert-butyl peroxide, peroxydicarbonates, such as dimyristyl peroxydicarbonate, dicetyl peroxydicarbonate, bis(4-tert-butylcyclohexyl) peroxydicarbonate, dicyclohexyl peroxydicarbonate, and bis(2-ethylhexyl) peroxydicarbonate, hydroperoxides, such as tert-butyl hydroperoxide, cumene hydroperoxide, alone or in a mixture. In the case of aqueous emulsion polymerization it is possible to use the customary initiators, such as sodium, potassium, and ammonium peroxodisulfate, for example, or else redox systems known to the skilled worker.

The manner in which the initiator is added to the polymerization vessel in the course of free-radical polymerization is known to the skilled worker. It may either be included completely in the initial charge to the polymerization vessel or else inserted continuously or in stages at the rate at which it is consumed in the course of the free-radical polymerization. Specifically, this will depend on the chemical nature of the initiator system and on the polymerization temperature. Preferably, a small portion is included in the initial charge and the remainder is supplied to the polymerization zone at the rate at which it is consumed. It is frequently favorable to conduct the polymerization reaction such that first of all $\leq 50\%$ by weight, often $\leq 45\%$ by weight or $\leq 40\%$ by weight, of the initiator are supplied to the polymerization vessel continuously over a relatively long period of time, after which $>50\%$, often $\geq 55\%$ by weight or $\geq 60\%$ by weight, of the initiator are supplied to the polymerization vessel continuously over a shorter period of time.

The polymerization may be conducted conventionally in a polymerization apparatus, which is generally equipped with a stirrer, two or more feed vessels and/or feed lines, reflux condensers, and heating and cooling devices, and which is equipped for operating under an inert gas atmosphere and under pressures above or below atmospheric pressure.

Following polymerization in solution, the solvents may be separated off, where appropriate under reduced pressure, operating at elevated temperatures of up to 150° C. The novel copolymers may then be used in the low-solvent or solvent-free state, i.e., in the form of melts, as adhesives, preferably pressure sensitive adhesives and especially hot-melt pressure sensitive adhesives, or as UV-curable binders in coating formulations, such as coating materials for coating mineral surfaces, for example, or as paints. In some cases it may also be of advantage to prepare the novel copolymers by copolymerization in bulk, i.e., without the presence of a solvent, in which case it is possible to operate batchwise or else continuously, in accordance for example with the teaching of U.S. Pat. No. 4,042,768.

Where the novel copolymers are used in the form of solutions—for example, as UV curable binders in coating formulations, such as coating materials for coating mineral surfaces or as paints, for example—the copolymer solutions contain normally from 1 to 900 parts by weight, preferably from 10 to 100 parts by weight, and with particular preference from 20 to 40 parts by weight, of solvent per 100 parts by weight of copolymer. For these purposes it is frequently possible to use the copolymer solutions obtainable from the solution polymerization directly, or to prepare formulations from them in a simple way by dilution or concentration.

In some cases, as for example when the novel copolymers are prepared by free-radically initiated aqueous emulsion polymerization, it is also possible to use customary regulators in the customary amounts, such as in amounts of from 0.1 to 10 parts by weight or from 0.5 to 5 parts by weight per 100 parts by weight of the monomers used for the polymerization. Such regulators are used in order to regulate the molecular weight of the copolymers and are known to the skilled worker. It is common to use mercapto compounds as regulators, such as 2-mercaptoethanol, 3-mercaptopropionic acid methyl ester, 3-mercaptopropyltrimethoxysilane, 3-mercaptopropylmethyldi-methoxysilane, 3-mercaptopropionic acid, n-decyl or tert-decyl mercaptan, 1,6-dimercaptohexane, 1,9-dimercaptononane, hydrocarbons, such as cumene, alcohols, such as iso-propanol and iso-butanol, or halogenated hydrocarbons, such as carbon tetrachloride, carbon tetrabromide, chloroform or bromoform, or ethers, such as tetrahydrofuran and dioxane.

Where the novel copolymers are prepared by free-radically initiated aqueous emulsion polymerization, this polymerization normally takes place in the presence of dispersants. As dispersants it is possible to use emulsifiers and/or protective colloids which are familiar to the skilled worker, examples being nonionic and also anionic or cationic emulsifiers. Preference is given to using nonionic and anionic emulsifiers. The amount of dispersant is usually up to 30 parts by weight, preferably from 0.5 to 10 parts by weight and with particular preference from 1 to 6 parts by weight, based on 100 parts by weight of the monomers to be polymerized.

After the end of the copolymerization it is common to remove unreacted monomers from the reaction mixture. In the case of solution polymerization this takes place simultaneously with the removal of the solvent under reduced pressure. In order to increase the efficiency here, especially on the plant scale, the copolymer is stripped with steam at the end of the solvent separation process. This steam stripping frequently takes place at the end of free-radically initiated emulsion polymerization likewise, where appropriate following an intervening postpolymerization step, such as is known to the skilled worker from, for example, the texts WO 95/33775, EP-A 767180, and DE-A 19743759. It is significant that the photoinitiators of the invention in copolymerized form, as compared with the copolymerizable photoinitiators known from the prior art, possess improved stability toward hydrolysis by water or other protic organic solvents, such as iso-propanol or iso-butanol, for example.

For the use of the novel copolymers, they may be conventionally modified and/or processed and used, for example, as hotmelt pressure sensitive adhesives. Thus it is possible to add, for example, customary tackifying resins, examples being hydrocarbon resins, modified natural rosins or chemically modified rosins, which are composed predominantly of abietic acid or abietic acid derivatives, cumarone-indene resins, terpene-phenolic resins, aldehyde resins or homopolymers, such as poly-2-ethylhexyl acrylate or poly-α-methylstyrene, and also plasticizers, based for example on monoester, diester or polyester compounds, perchlorinated hydrocarbons or liquid paraffins, dyes and pigments, or stabilizers or elastomeric substances, such as natural or synthetic rubber, polyvinyl ethers, and also, furthermore, polybutadiene oils, in amounts of from 0.1 to 50% by weight, based on the total mass.

Further suitable modifying compounds include mono- or polyolefinically unsaturated compounds of relatively high molecular mass, such as, for example, polyesterols and polyetherols esterified with acrylic acid, such as the acrylates of tripropylene glycol, tetraethylene glycol or other polyethylene glycols. Also suitable are diacrylates and dimethacrylates of polytetrahydrofuran with molecular weights of generally from 250 to 2000 (numerical averages). Compounds of this kind containing at least diolefinic unsaturation can be used with advantage in amounts of from 0.1 to 10 parts by weight per 100 parts by weight of copolymer, particular interest attaching to diolefinically unsaturated compounds of this kind having a molecular weight of at least 500 (numerical average).

The novel copolymers are particularly suitable as melts, as solutions or in the form of aqueous dispersions for producing coatings, coverings, and impregnated systems, especially pressure sensitive adhesives, pressure sensitive adhesive sheets, and pressure sensitive adhesive labels, and also hot-stamping foils. The compositions may be applied conventionally by spreading, spraying, rolling, knifecoating or flowcoating, where appropriate at elevated temperature (usually in the temperature range from 20 to 150° C.), to customary substrates, examples being paper, card, wood, metals, such as aluminum, polymer films, such as plasticized PVC, polyethylene, polyamides, polyethylene glycol terephthalate, and polypropylene.

Where solvents are used, they are easy to remove from the coatings by evaporation, where appropriate at room temperature or slightly elevated temperatures, generally at temperatures from 20 to 150° C. and preferably at from 50 to 80° C., in which case use is commonly made of radiant heaters or hot air circulation devices. The applied films, where appropriate after (initial) drying, can subsequently be crosslinked by exposure to UV light, giving readily adhering coverings which exhibit high cohesion in conjunction with good adhesion and excellent aging stability. Irradiation with UV light does not normally require inert gas conditions and can usually take place in air. Suitable UV sources include the customary sources, examples being low, medium or high pressure mercury vapor lamps, which may have outputs of from 20 to 100 J/s×cm$^2$. Lamps with a higher output generally allow more rapid crosslinking. In some cases, during the crosslinking irradiation, residual solvent or water can be removed at the same time by the IR component of the lamps.

The adhesive properties of flat substrates with a film of pressure sensitive adhesive can be ascertained by measuring the shear strength, as a measure of the cohesion, and the peel strength as a measure of the surface tackiness.

EXAMPLES

I Preparation of the Copolymerizable Photoinitiators

I a) 4-Vinyloxybenzophenone (Photoinitiator A)

A mixture of 650 g of 4-hydroxybenzophenone (98% by weight, Avocado, Research Chemicals Ltd.), 750 ml of N-methylpyrrolidone (>99% by weight, BASF AG) and 60 g of zinc naphthenate (Nusa; zinc salts of naphthenic acids, zinc content 12% by weight) was charged with stirring to a 2.5 l autoclave and flushed with nitrogen. After it had been heated to 190° C., injection was carried out first with nitrogen to 2 bar and then with acetylene to 20 bar. During the reaction, further acetylene was supplied to replace that consumed by reaction, so as to maintain a constant pressure of 20 bar. After a reaction time of 12 hours the batch was cooled to 20–25° C. (room temperature) and let down to atmospheric pressure. The solvent was distilled off under reduced pressure at a bridge temperature of from 70 to 80° C. with a pressure of 1 mbar (absolute). 310 g of Pluriol® E 600 (polyethylene glycol, trademark of BASF AG) were then added and the product was purified by a Sambay distillation at 1.2 mbar (absolute) and a bridge temperature of 163° C. This gave a total of 522 g of 4-vinyloxybenzophenone having a purity of from 96 to 99% by weight and a melting point of 58° C.

I b) 4-Acryloyloxybenzophenone (Comparison Photoinitiator)

4-Acryloyloxybenzophenone was prepared in accordance with EP-A 246848, Example A.

II Preparation of the Copolymers

Example 1

A heatable and coolable 2 l glass reactor equipped with an anchor stirrer, reflux condenser, evacuating means and metering means was charged at room temperature and under nitrogen with 108.5 g of iso-butanol (IB; 99.5% by weight)
    50.5 g of feed stream 1 and
        4.3 g of feed stream 2 and the closed apparatus was heated with stirring to 100° C. without pressure compensation. Beginning simultaneously and at this temperature, the remainder of feed stream 1 was metered in over the course of 3 hours and the remainder of feed stream 2 over the course of 3.5 hours. 15 minutes after the end of feed stream 2, feed stream 3 was commenced, and was metered in over the course of 15 minutes. Simultaneously with the metering of feed stream 3, the temperature was raised to 120° C.

After the end of feed stream 3, postpolymerization was conducted at 120° C. for one hour more. The temperature was then lowered to 100° C., the overpressure was carefully let down to atmospheric pressure, and thereafter the solvent and the other low boilers were distilled off by careful application of reduced pressure down to a final pressure of 10 mbar (absolute). The reaction batch was then cooled to room temperature.

Feed Stream 1

491.0 g of n-butyl acrylate (nBA; ≧99.5% by weight, BASF AG)
278.5 g of 2-ethylhexyl acrylate (EHA; ≧99.6% by weight, BASF AG)
189.0 g of methyl methacrylate (MMA; ≧99.9% by weight, BASF AG)
    23.0 g of acrylic acid (AA; ≧99.0% by weight, BASF AG)
        4.3 g of photoinitiator A Feed Stream 2
    41.7 g of IB
        0.3 g of tert-butyl per-2-ethylhexanoate (TBEH; ≧98.5% by weight, Peroxid-Chemie GmbH)

Feed Stream 3
    16.7 g of IB
        2.0 g of TBEH

A clear polymer of high viscosity was obtained which had a solids content of >99.9% by weight.

The solids content was generally determined by heating 1–2 g of the resulting polymer in an aluminum crucible with a diameter of about 3 cm at 140° C. under atmospheric pressure to constant weight. Two measurements were conducted in each case. The figures stated represent the averages from these measurements. In all of the following examples, solids contents >99.9% by weight were likewise found.

The K value of the copolymer was 49.9.

The K values of the copolymers were generally determined in accordance with H. Fikentscher, Cellulosechemie 1932 (13) pages 58 to 64 and pages 71 to 74, with K=k×10$^3$. The measurements were conducted at 25° C. on a 1% strength by weight solution of the copolymers in THF (in accordance with DIN ISO 1628-1).

Comparative Example 1

Comparative example 1 was like Example 1 except that instead of photoinitiator A the same amount of the comparison photoinitiator was used. The K value measured was 50.5.

Example 2

Example 2 was like Example 1 except that instead of IB methyl ethyl ketone (MEK; ≧99.0% by weight, Deutsche Shell Chemie GmbH) was used. A K value of 50.8 was measured.

Comparative Example 2

Comparative example 2 was like Example 2 except that instead of photoinitiator A the same amount of the comparison photoinitiator was used. The K value measured was 50.2.

Example 3

Example 3 was like Example 1 except that the TBEH in feed streams 2 and 3 was replaced by 2,2'-azobis-2-methylbutyronitrile (Wako V59, WAKO Chemicals GmbH). The K value measured was 51.2.

Example 4

A heatable and coolable 2 l glass reactor equipped with an anchor stirrer, reflux condenser, evacuating means and metering means was charged at room temperature and under nitrogen with
110.5 g of IB
    52.5 g of feed stream 1 and
        4.0 g of feed stream 2 and the closed apparatus was heated with stirring to 100° C. without pressure compensation. Beginning simultaneously and at this temperature, the remainder of feed stream 1 was metered in over the course of 3 hours and the remainder of feed stream 2 over the course of 3.5 hours. 15 minutes after the end of feed stream 2, feed stream 3 was commenced, and was metered in over the course of 15 minutes. Simultaneously with the metering of feed stream 3, the temperature was raised to 120° C.

After the end of feed stream 3, postpolymerization was conducted at 120° C. for one hour more. The temperature was then lowered to 100° C., the overpressure was carefully let down to atmospheric pressure, and thereafter the solvent and the other low boilers were distilled off by careful application of reduced pressure down to a final pressure of 10 mbar (absolute). The reaction batch was then cooled to room temperature. A clear polymer of high viscosity was obtained having a solids content of >99.9% by weight. The K value was found to be 48.8.

Feed Stream 1
422.0 g of nBA
347.5 g of EHA
189.0 g of MMA
    25.0 g of AA
        4.3 g of photoinitiator A Feed Stream 2
    41.7 g of IB
        0.4 g of TBEH Feed Stream 3
    16.7 g of IB
        2.4 g of TBEH

Example 5

Example 5 was like Example 4 except that MEK was used instead of IB. A K value of 50.7 was measured.

Example 6

Example 6 was like Example 4 except that 5.0 g of photoinitiator A were used. The K value measured was 48.3.

Example 7

Example 7 was like Example 4 except that 3.6 g of photoinitiator A were used. The K value measured was 48.3.

Example 8

A heatable and coolable 2 l glass reactor equipped with an anchor stirrer, reflux condenser, evacuating means and metering means was charged at room temperature and under nitrogen with
115.0 g of IB
   59.5 g of feed stream 1 and
     3.3 g of feed stream 2 and the closed apparatus was heated with stirring to 100° C. without pressure compensation. Beginning simultaneously and at this temperature, the remainder of feed stream 1 was metered in over the course of 3.5 hours and the remainder of feed stream 2 over the course of 4 hours. 15 minutes after the end of feed stream 2, feed stream 3 was commenced, and was metered in over the course of 15 minutes. Simultaneously with the metering of feed stream 3, the temperature was raised to 115° C.

After the end of feed stream 3, postpolymerization was conducted at 115° C. for two hours more. The temperature was then lowered to 100° C., the overpressure was carefully let down to atmospheric pressure, and thereafter the solvent and the other low boilers were distilled off by careful application of reduced pressure down to a final pressure of 10 mbar (absolute). The reaction batch was then cooled to room temperature. A clear polymer of high viscosity was obtained having a solids content of >99.9% by weight. The K value was found to be 49.7.

Feed Stream 1
1117.0 g of nBA
   59.1 g of AA
     4.3 g of photoinitiator A

Feed Stream 2
65.8 g of IB
   1.3 g of TBEH

Feed Stream 3
19.7 g of IB
   2.6 g of TBEH

Example 9

A heatable and coolable 2 l glass reactor equipped with an anchor stirrer, reflux condenser, evacuating means and metering means was charged at room temperature and under nitrogen with
115.0 g of IB
   59.5 g of feed stream 1 and
     3.3 g of feed stream 2 and the closed apparatus was heated with stirring to 100° C. without pressure compensation. Beginning simultaneously and at this temperature, the remainder of feed stream 1 was metered in over the course of 3.5 hours and the remainder of feed stream 2 over the course of 4 hours. 15 minutes after the end of feed stream 2, feed stream 3 was commenced, and was metered in over the course of 15 minutes. Simultaneously with the metering of feed stream 3, the temperature was raised to 115° C.

After the end of feed stream 3, postpolymerization was conducted at 115° C. for two hours more. The temperature was then lowered to 100° C., the overpressure was carefully let down to atmospheric pressure, and thereafter the solvent and the other low boilers were distilled off by careful application of reduced pressure down to a final pressure of 10 mbar (absolute). The reaction batch was then cooled to room temperature. A clear polymer of high viscosity was obtained having a solids content of >99.9% by weight. The K value was found to be 51.9.

Feed Stream 1
1100.0 g of nBA
   55.1 g of AA
   22.0 g of maleic anhydride (MAA; >99.7% by weight, Lonza S.P.A.)
    4.3 g of photoinitiator A Feed Stream 2
65.8 g of IB
   1.3 g of TBEH Feed Stream 3
19.7 g of IB
   2.6 g of TBEH

Example 10

A heatable and coolable 2 l glass reactor equipped with an anchor stirrer, reflux condenser, evacuating means and metering means was charged at room temperature and under nitrogen with
115.0 g of IB
   59.5 g of feed stream 1 and
     3.3 g of feed stream 2 and the closed apparatus was heated with stirring to 100° C. without pressure compensation. Beginning simultaneously and at this temperature, the remainder of feed stream 1 was metered in over the course of 3.5 hours and the remainder of feed stream 2 over the course of 4 hours. 15 minutes after the end of feed stream 2, feed stream 3 was commenced, and was metered in over the course of 15 minutes. Simultaneously with the metering of feed stream 3, the temperature was raised to 115° C.

After the end of feed stream 3, postpolymerization was conducted at 115° C. for two hours more. The temperature was then lowered to 100° C., the overpressure was carefully let down to atmospheric pressure, and thereafter the solvent and the other low boilers were distilled off by careful application of reduced pressure down to a final pressure of 10 mbar (absolute). The reaction batch was then cooled to room temperature. A clear polymer of high viscosity was obtained having a solids content of >99.9% by weight. The K value was found to be 50.1.

Feed Stream 1
1043.0 g of nBA
   133.1 g of AA
    10.0 g of photoinitiator A

Feed Stream 2
65.0 g of IB
  1.7 g of TBEH

Feed Stream 3
19.9 g of IB
  2.6 g of TBEH

Example 11

Example 11 was prepared as for Example 10 but using the following feed streams:

Feed Stream 1
1000.0 g of nBA
  105.1 g of AA
    72.0 g of MAA
    5.8 g of photoinitiator A Feed Stream 2
68.4 g of IB
  1.7 g of TBEH Feed Stream 3
19.7 g of IB
  2.8 g of TBEH
  A K value of 50.2 was found.

Example 12

A heatable and coolable 2 l glass reactor equipped with an anchor stirrer, reflux condenser, evacuating means and metering means was charged at room temperature and under nitrogen with
110.0 g of IB
  59.0 g of feed stream 1 and
  2.5 g of feed stream 2 and the closed apparatus was heated with stirring to 100° C. without pressure compensation. Beginning simultaneously and at this temperature, the remainder of feed stream 1 was metered in over the course of 4 hours and the remainder of feed stream 2 over the course of 4.5 hours. 15 minutes after the end of feed stream 2, feed stream 3 was commenced, and was metered in over the course of 15 minutes. Simultaneously with the metering of feed stream 3, the temperature was raised to 115° C.

After the end of feed stream 3, postpolymerization was conducted at 115° C. for two hours more. The temperature was then lowered to 100° C., the overpressure was carefully let down to atmospheric pressure, and thereafter the solvent and the other low boilers were distilled off by careful application of reduced pressure down to a final pressure of 10 mbar (absolute). The reaction batch was then cooled to room temperature. A clear polymer of high viscosity was obtained having a solids content of >99.9% by weight. The K value was found to be 49.0.

Feed Stream 1
910.0 g of EHA
  91.0 g of 2-hydroxyethyl acrylate (≧98.5% by weight, BASF AG)
  10.5 g of photoinitiator A Feed Stream 2
35.8 g of IB
  0.8 g of TBEH Feed Stream 3
21.7 g of IB
  2.8 g of TBEH III Performance Tests The copolymers prepared in Examples 1 to 12 were investigated for their PSA performance properties. The procedure adopted for this was as follows:

a) Preparation of the test strips

The test copolymer was investigated without the addition of tackifiers. On a heatable coating bench at from 85 to 120° C., the copolymer was applied in a thin film, using a doctor blade, to a standard commercial polyester film (Hostaphan film RN 36) and then cooled to room temperature. The slot size of the doctor blade was chosen so as to give a copolymer application rate of from 19 to 21 g/m$^2$. Irradiation was carried out with a CK lamp from IST-Strahlentechnik Metz GmbH, which had an output of 75 mJ/sxcm$^2$. For this purpose the coated film was placed on a moving endless belt so that the coated film passed beneath the lamp at a distance of 10 cm and at a speed of 58 m/min. Irradiation was carried out under air. The sheets produced in this way were cut into strips 2.5 cm wide and 25 cm long.

b) Testing of the shear strength (in accordance with FINAT FTM 7)

Each test strip was bonded to the edge of a stainless steel test panel so as to give a bond area of 12.5×12.5 mm$^2$. 10 minutes after bonding, a 1000 g weight was fastened to the protruding end of the sheet and the test panel was suspended vertically in a space having a temperature of 23° C. (constant) and a relative humidity of 50%. The time until the bond breaks under the influence of the weight is a measure of the shear strength, which in turn represents a measure of the cohesion. The longer the period of time until the bond breaks, the greater the cohesion. For each polymer, three independent measurements were carried out. The figures given in Table 1 represent averages from these three measurements.

c) Testing of the peel strength (in accordance with FINAT FTM 1)

A test strip was bonded to a stainless steel test panel at 23° C. and 50% relative humidity.

Following a prescribed contact period of 24 hours, the strip was peeled from the test panel at an angle of 180° and a speed of 300 mm per minute using a tensile tester machine. The force required to achieve this is a measure of the adhesion. It is termed the peel strength and is expressed in newtons per 2.5 cm (N/2.5 cm). The higher the value for the peel strength after the stated time, the higher the adhesion. For each polymer, three independent measurements were carried out. The figures given in Table 1 represent averages from these three measurements.

TABLE 1

Overview of the shear strength and peel strength of the copolymers obtained from Examples 1 to 12

| Polymer from Example | Shear strength in minutes | Peel strength in N/2.5 cm after 24 hours |
|---|---|---|
| 1 | 125 | 12.2 |
| Comparative 1 | 109 | 9.7 |
| 2 | 122 | 11.8 |
| Comparative 2 | 107 | 9.3 |
| 3 | 130 | 10.9 |
| 4 | 150 | 11.9 |
| 5 | 151 | 12.0 |
| 6 | 146 | 12.3 |
| 7 | 156 | 12.4 |
| 8 | 124 | 13.1 |
| 9 | 116 | 12.2 |
| 10 | 130 | 10.8 |

TABLE 1-continued

Overview of the shear strength and peel strength of the copolymers obtained from Examples 1 to 12

| Polymer from Example | Shear strength in minutes | Peel strength in N/2.5 cm after 24 hours |
|---|---|---|
| 11 | 138 | 9.9 |
| 12 | 123 | 10.9 |

As is clearly evident from Table 1, the hotmelt pressure sensitive adhesives of the invention have much higher shear strengths (cohesion) than a pressure sensitive adhesive prepared using a noninventive photoinitiator. Likewise greatly improved are the peel strengths obtained after 24 hours (adhesion).

IV Stability Testing

In order to test the stability to hydrolysis, 70% by weight solutions in IB of inventive and noninventive copolymers were prepared and were stirred under nitrogen in a closed vessel at 115° C. Samples were taken of these solutions after 36 and after 72 hours and the shear strengths of the polymer films were determined as described in Section III above. The corresponding results are listed in Table 2.

TABLE 2

Shear strength as a measure of the hydrolysis resistance

| Polymer from Example | Stirring times in hours | Shear strength in minutes |
|---|---|---|
| 1 | 0 | 125 |
|   | 36 | 124 |
|   | 72 | 119 |
| Comparative 1 | 0 | 109 |
|   | 36 | 12 |
|   | 72 | 1 |
| 2 | 0 | 122 |
|   | 36 | 120 |
|   | 72 | 118 |
| Comparative 2 | 0 | 107 |
|   | 36 | 29 |
|   | 72 | 18 |

As is evident from Table 2, the hotmelt pressure sensitive adhesives of the invention have a markedly higher hydrolysis resistance than a pressure sensitive adhesive prepared using a noninventive photoinitiator.

We claim:

1. A copolymerizable photoinitiator comprising acetophenone or benzophenone derivatives of the formula I,

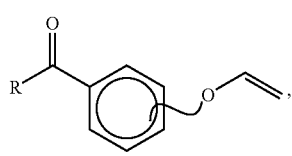

(I)

wherein
R is unsubstituted or substituted $C_1$ to $C_3$ alkyl, $C_6$ to $C_{10}$ aryl or aralkyl having from 6 to 10 carbon atoms in the aryl moiety and from 1 to 6 carbon atoms in the alkyl moiety.

2. A copolymer comprising from 0.01 to 10% by weight of acetophenone or benzophenone derivatives of the formula I in copolymerized form,

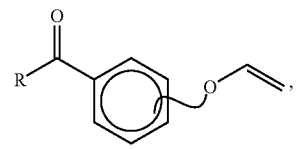

(I)

wherein
R is unsubstituted or substituted $C_1$ to $C_3$ alkyl, $C_6$ to $C_{10}$ aryl or aralkyl having from 6 to 10 carbon atoms in the aryl moiety and from 1 to 6 carbon atoms in the alkyl moiety.

3. A process for preparing a copolymer, which comprises polymerizing a mixture of ethylenically unsaturated compounds (monomers) comprising from 0.01 to 10% by weight of acetophenone or benzophenone derivatives of the formula I,

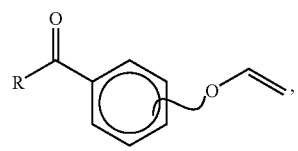

(I)

wherein
R is unsubstituted or substituted $C_1$ to $C_3$ alkyl, $C_6$ to $C_{10}$ aryl or aralkyl having from 6 to 10 carbon atoms in the aryl moiety and from 1 to 6 carbon atoms in the alkyl moiety.

4. The process as claimed in claim 3, wherein said polymerizing step is initiated free-radically.

5. The process as claimed in claim 4, wherein said polymerizing step is carried out in the form of a solution polymerization.

6. A copolymer prepared by the process as claimed in claim 3.

7. The copolymer as claimed in claim 2, having a glass transition temperature of from −70 to +150° C.

8. A UV-curable binder or adhesive comprising the copolymer as claimed in claim 2.

9. A pressure sensitive adhesive which comprises the UV-curable binder or adhesive as claimed in claim 8.

10. The copolymer as claimed in claim 6 having a glass transition temperature of from −70 to +150° C.

11. A UV-curable binder or adhesive comprising the copolymer as claimed in claim 6.

12. A pressure sensitive adhesive which comprises the UV-curable binder or adhesive as claimed in claim 11.

* * * * *